United States Patent
Bucknell et al.

(10) Patent No.: US 12,483,925 B2
(45) Date of Patent: Nov. 25, 2025

(54) CONFIGURABLE APPLICATION DATA FILTERING IN A TELECOMMUNICATIONS NETWORK

(71) Applicant: FUJITSU LIMITED, Kawasaki (JP)

(72) Inventors: Paul Bucknell, Peacehaven (GB); Timothy Moulsley, Caterham (GB)

(73) Assignee: FUJITSU LIMITED, Kawasaki (JP)

( * ) Notice: Subject to any disclaimer, the term of this patent is extended or adjusted under 35 U.S.C. 154(b) by 496 days.

(21) Appl. No.: 17/979,837

(22) Filed: Nov. 3, 2022

(65) Prior Publication Data
US 2023/0052159 A1    Feb. 16, 2023

Related U.S. Application Data

(63) Continuation of application No. PCT/EP2021/068076, filed on Jun. 30, 2021.

(30) Foreign Application Priority Data

Jul. 24, 2020 (EP) .................................... 20187794

(51) Int. Cl.
*H04W 28/02* (2009.01)
*G06N 5/04* (2023.01)
(Continued)

(52) U.S. Cl.
CPC .......... *H04W 28/0263* (2013.01); *G06N 5/04* (2013.01); *G06N 20/00* (2019.01); *H04W 24/02* (2013.01); *H04W 80/12* (2013.01)

(58) Field of Classification Search
CPC . H04W 28/0263; H04W 80/12; H04W 24/02; G06N 20/00; G06N 5/04
(Continued)

(56) References Cited

U.S. PATENT DOCUMENTS

2012/0170552 A1* 7/2012 Oprescu-Surcobe ....................... H04W 28/16 370/332
2017/0317904 A1* 11/2017 Rasanen ............. H04L 47/2475
2019/0254118 A1    8/2019 Dao et al.

FOREIGN PATENT DOCUMENTS

AU    2019100273 A4    5/2019
GB       2571342 A     8/2019
(Continued)

OTHER PUBLICATIONS

Extended European search report with the European search opinion issued by the European Patent Office for corresponding European Patent Application No. 20187794.1-1212, dated Feb. 11, 2021.
(Continued)

*Primary Examiner* — Michael R Neff
(74) *Attorney, Agent, or Firm* — Myers Wolin, LLC

(57) ABSTRACT

A method in a telecommunications system including a Data Network, DN, a base station, a connection via the base station from the DN to a User Equipment, UE, executing a UE application producing application data, and an algorithm entity on the DN, wherein the base station transmits network configuration information to a DN application executing on the algorithm entity, the DN application produces and transmits a filtering configuration based on the network configuration information to the UE for use in filtering the application data before transmission to the algorithm entity, allowing the UE to produce application data filtered according to the filtering configuration, and the connection transmits the filtered application data to the algorithm entity.

18 Claims, 13 Drawing Sheets

(51) Int. Cl.
*G06N 20/00* (2019.01)
*H04W 24/02* (2009.01)
*H04W 80/12* (2009.01)

(58) Field of Classification Search
USPC ..................................................... 455/422.1
See application file for complete search history.

(56) References Cited

FOREIGN PATENT DOCUMENTS

| KR | 20-0470195 Y1 | 10/2013 |
|---|---|---|
| WO | 2017/050008 A1 | 3/2017 |
| WO | 2019/029802 A1 | 2/2019 |

OTHER PUBLICATIONS

China Mobile, "KI #8, New Sols, Providing UE Analytics to the NWDAF", Agenda Item: 8.1, SA WG2 Temporary Document, S2-2004153, Elbonia, Jun. 1-12, 2020.

3GPP TR 23.700-91 V0.4.0, 3rd Generation Partnership Project; Technical Specification Group Services and System Aspects; Study on enablers for network automation for the 5G System (5GS); Phase 2 (Release 17), Jun. 2020.

Ericsson, "Status Quo and way forward for Ue Rrm policy handling", Agenda Item: 25.2.4, 3GPP TSG-RAN WG3 Meeting #103, R3-190835, Athens, Greece, Feb. 25-Mar. 1, 2019.

Liu et al., "Data-Importance Aware Radio Resource Allocation: Wireless Communication Helps Machine Learning", [cs.IT], May 2020.

Pateromichelakis et al., "End-to-End Data Analytics Framework for 5G Architecture", IEEE Access, Special Section on Roadmap to 5G: Rising to the Challenge, Mar. 5, 2019, pp. 40295-40312, vol. 7.

International Search Report with the Written Opinion of the International Searching Authority issued by the European Patent Office for corresponding International Patent Application No. PCT/EP2021/068076, mailed on Aug. 18, 2021.

* cited by examiner

CONFIGURABLE APPLICATION DATA FILTERING IN A TELECOMMUNICATIONS NETWORK

CROSS-REFERENCE TO RELATED APPLICATION

This application is a continuation application of International Application PCT/EP2021/068076 filed on 30 Jun. 2021, which claims priority from European Patent Application 20187794.1 filed on 24 Jul. 2020, and designated the U.S., the entire contents of each are incorporated herein by reference.

FIELD

The present disclosure relates to a method in a wireless communication network. The present disclosure further relates to a user equipment and base station and methods therein.

Particularly, but not exclusively, the present disclosure relates to techniques for adapting elements in a wireless communication network such as a 4G (LTE-A) or 5G (also known as New Radio, NR) wireless communication network for use with resource-intensive applications such as AI (Artificial Intelligence) applications, video processing or real-time control.

BACKGROUND

Wireless communication networks are widely known in which terminals (also called user equipments or UEs, subscriber or mobile stations) communicate over an air interface with base stations within communication range of the terminals. This part of the network is known as a Radio Access Network (RAN). Further communication may take place in a core network between base stations and other entities, usually with wired connections.

The geographical areas served by one or more base stations are generally referred to as cells, and typically many base stations are provided in appropriate locations so as to form a system covering a wide geographical area, more or less seamlessly with adjacent and/or overlapping cells.

Typically, many transmission points are provided in appropriate locations so as to form a network covering a wide geographical area more or less seamlessly with adjacent and/or overlapping cells (in this specification, the terms "system" and "network" are used synonymously). For each cell, a base station, which provides or at least manages the transmission point, divides the available bandwidth, i.e. frequency and time resources, into individual resource allocations for the terminals served by the cell. In this way, a signal transmitted in a cell and scheduled by the base station has a specific location in the frequency and time domains. The terminals may be mobile and therefore may move among the cells, prompting a need for handover of the connection of the terminal to the network as the terminal moves between adjacent cells. A terminal may be in range of (i.e. able to detect signals from and/or communicate with) several cells at the same time, but in the simplest case it communicates with one "serving" cell. A terminal is normally only able to access a single network provided by a single operator. However, networks/operators may cooperate.

A Radio Access Technology, RAT, is an underlying physical connection method for a radio-based (wireless) communication network. One Radio Access Technology, RAT, or type of wireless system is based upon the set of standards referred to as Long-Term Evolution, LTE or LTE-A (Advanced) for later versions. In the system topology, in LTE (which is used here in general for LTE and LTE-A), each terminal—a UE— connects wirelessly over a radio/air interface (Uu) to a base station in the form of an enhanced node-B or eNB.

Incidentally, the above discussion by default refers to UEs operated by human users, for example in the form of mobile phones, laptop computers and PDAs or tablets. However, a wireless communication network may also be used for so-called Machine Type Communication (MTC) used in the Internet of Things (IoT), where MTC is a form of data communication that involves one or more entities that do not necessarily need human interaction. Entities involved in MTC, henceforth referred to as MTC devices (or terminals), are also to be considered as a kind of UE except where the context demands otherwise. Applications of MTC devices include sensors, video/imaging devices, fleet management, smart metering, product tracking, home automation, e-health, etc. MTC or IoT devices are often in fixed locations, in contrast to the mobile devices of human users, or they may be positioned, for example on drones or other vehicles.

A next-generation radio access system to succeed LTE is known as "5G" or "NR" (New Radio) and is needed to satisfy modern requirements for increased bandwidth, efficiency and flexibility.

As part of the physical layer (PHY) design in 5G, the traditional concept of a base station that both schedules resources and houses the physical antennas for wireless communication with terminals (whether for human use or as part of the IoT), becomes more fluid. Terminology used with respect to 5G/NR includes "gNB" (next generation Node B), which manages (either locally or remotely) at least one transmission point. Such a transmission point may also serve as a reception point and is typically referred to as a TRP or TRxP (Transmission/Reception Point).

In the 4G core network (CN), called the Evolved Packet Core (EPC), protocol and reference points (interfaces) are defined for each entity such as the Mobility Management Entity (MME), Serving Gateway (S-GW), and Packet Data Network Gateway (P-GW) as described above. Alternatively, in the 5G core, protocol and reference points (interfaces) are defined for each Network Function (NF). A NF may be implemented either as a network element on a dedicated hardware, as a software instance running on a dedicated hardware, or as a virtualised function (not limited to specific hardware) instantiated on an appropriate platform, e.g., a cloud infrastructure.

FIG. 1 depicts the non-roaming reference 5G System architecture.

Specification 3GPP TS 23.501 describes the architecture for the 5G System. The 5G architecture is defined as service-based and the interaction between network functions is represented in two ways:

A service-based representation, where network functions (NFs) (e.g. AMF) within the Control Plane enables other authorized network functions to access their services. This representation also includes point-to-point reference points where necessary.

A reference point representation, which shows the interaction existing between the NF services in the network functions described by point-to-point reference point (e.g. N11) between any two network functions (e.g. AMF and SMF).

Service-based interfaces are used within the Control Plane. The 5G System architecture consists of the following network functions (NF) (not all of which are shown in FIG. 1):

Authentication Server Function (AUSF).
Access and Mobility Management Function (AMF).
Data Network (DN), e.g. operator services, Internet access or 3rd party services.
Unstructured Data Storage Function (UDSF).
Network Exposure Function (NEF).
Network Repository Function (NRF).
Network Slice Specific Authentication and Authorization Function (NSSAAF).
Network Slice Selection Function (NSSF).
Policy Control Function (PCF).
Session Management Function (SMF).
Unified Data Management (UDM).
Unified Data Repository (UDR).
User Plane Function (UPF).
UE radio Capability Management Function (UCMF).
Application Function (AF).
User Equipment (UE).
(Radio) Access Network ((R)AN).
5G-Equipment Identity Register (5G-EIR).
Network Data Analytics Function (NWDAF).
CHarging Function (CHF).

The 5G System architecture also comprises the following network entities:

Service Communication Proxy (SCP).
Security Edge Protection Proxy (SEPP).

The UE is shown at the bottom left, connected to the RAN (the gNB). There is also a direct connection between the UE and the 5G Core Access and Mobility Management Function (AMF) via the N1 interface, mainly for non-access stratum (NAS) signalling. The gNB (RAN) connects with the UPF over the N3 interface (the N9 interface is between two different UPFs—not shown). The N4 interface connects the UPF to the Session Management Function (SMF) and the N2 interface connects the RAN (that is the gNB) to the AMF. The N6 interface is to the Data Network (DN) and this is where a connection to a server/entity running an AI function is likely to be situated.

In the architecture shown in FIG. 1, User Plane (UP) Data is transferred though the User Plane Function (UPF) to the Data Network (DN). In one embodiment, an AI or similar application (for example running on the UE and connected to an AI entity in the DN) uses the data directly from the DN.

Current network configuration methods are not always able to efficiently match radio resource usage with the demands from diverse applications due to a lack of detailed knowledge in the network about traffic flows.

It is desirable to provide new methods for the enhancement of network configuration, aimed at improving the overall radio efficiency, for example for the support of uplink (UL) and downlink (DL) streams of user data.

It is desirable to adapt the signalling in telecommunications networks such as this 5G architecture to optimise it for such use.

SUMMARY

According to a first aspect of the disclosure, there is provided a method in a (wireless) telecommunications system including a Data Network, DN, a base station, a connection via the base station from the Data Network to a User Equipment, UE, and an algorithm entity (such as a programmed server) on the DN.

A UE application may execute on the UE producing application data (for use in an application on the algorithm entity, such as on the internet/cloud). The base station transmits network configuration information (for the UE radio interface) to the DN application executing on the algorithm entity. This is the "master" application for which the UE is collecting data.

The DN application produces and transmits a filtering configuration (or instruction) based on the network configuration information to the UE. This instruction is for use in filtering the application data before transmission to the algorithm entity. Use of the network configuration information allows the filtering (which is likely to take place anyway) to be suited to the particular network conditions, as well as, of course to the requirements of the DN application.

The UE may filter the application data according to the filtering configuration and the connection transmits the filtered application data to the DN application/algorithm entity.

The DN application may be an application that consumes a significant amount of data and, in one embodiment, is an algorithmic application. It may be an Artificial Intelligence, AI, application, preferably a machine learning application. In this case the application data produced by the UE may be used in the training or inference phase of the AI application or both. If the application data produced by the UE is used in both the training and inference phases of the AI application, the algorithm may adapt the filtering to the requirements of the particular phase and apply a different filtering configuration in each phase. For example, in the training phase typically larger volumes (in terms of bit-rates) are used as more data is needed for the training of the AI application (typically using Machine Learning techniques). In the inference phase, it is expected that lower volumes of data (in terms of bit-rates) are needed as the trained AI Application does not need as much information in the application data to make the required inferences.

The AI application running on the algorithm entity may initially carry out filtering as part of inference or training and the filtering at the algorithm entity is then at least partially transferred to the UE by the filtering configuration.

The filtering configuration may not remain constant, for example it may be tuned during the training or inference phase, as part of the execution of the AI application, preferably using reinforcement learning.

The algorithm entity may further include a determination application (separately or as part of the AI application) which may determine one or more preferred network configurations associated with the transfer of the application data between the UE (terminal) and the base station, and send the preferred network configuration to the gNB. The gNB may forward the network configuration as appropriate to the UE.

These one or more preferred network configurations may be based on the network (UE) configuration information and/or may be based on the application data from the UE used in the DN application. If more than one is sent to the gNB, the gNB (or SMF) may select the best configuration according to its knowledge of the network.

Equally, the algorithm entity receives a plurality of possible network configurations from the gNB or an SMF and determines the at least one preferred network configuration from these possible network configurations. Thus, the gNB or SMF can have significant influence on the network configuration.

The UE configuration information may be sent regularly, or automatically by the gNB to the algorithm entity. Alternatively, the algorithm entity may transmit a request for the configuration information.

In some cases, unfiltered application data may be sent from the UE to the algorithm entity before the UE starts filtering. This allows the process and resource baseline to be established before filtering begins and allows the system to gain an impression of the amount of data to be sent and of data transmission requirements.

In many circumstances, the telecommunications system is connected to a plurality of UEs, each executing an instance of the UE application. A data stream for each UE may be either separate within the base station in different flows or combined within the base station into a common data flow. The decision as to the combination or separation is advantageously controlled by the Session management Function, SMF.

The filtering configuration is transmitted over the radio interface using any suitable methodology. In one example, a UE-specific control signalling channel is used, preferably in the RRC layer (using an RRC container), and applies the filter via non-Access Stratum, NAS to the UE application. Alternatively, the filtering configuration may be transmitted over the radio interface using application layer signalling carried by the radio interface as user data.

According to a further aspect of the disclosure, there is provided a telecommunications system including a Data Network, DN, a base station, a connection via the base station from the DN, to a User Equipment, UE, executing a UE application producing application data, and an algorithm entity on the DN, wherein the base station is configured to transmit network configuration information to a DN application executing on the algorithm entity; the DN application is configured to produce and transmit a filtering configuration based on the network configuration information to the UE for use in filtering the application data before transmission to the algorithm entity, allowing the UE to filter the application data according to the filtering configuration and the connection is configured to transmit the filtered application data to the algorithm entity.

According to a still further aspect of the disclosure, there is provided a User Equipment, UE, accessing a telecommunications system including the UE, a base station, a connection from the UE to a Data Network, DN, via the base station, and an algorithm entity on the DN, wherein the UE is configured to: execute a UE application producing application data; receive a filtering configuration for the application data from a DN application executing on the algorithm entity, the filtering configuration being based on network configuration information sent from the base station to the algorithm entity; filter the application data according to the filtering configuration; and to transmit the filtered application data to the algorithm entity. Hence the UE may comprise a transmitter and a receiver and a processor and memory to execute the UE application.

According to a yet further aspect of the disclosure, there is provided a corresponding method in a User Equipment, UE, accessing a telecommunications system including the UE, a base station, a connection from the UE to a Data Network, DN, via the base station, and an algorithm entity on the DN, wherein the UE: executes a UE application producing application data; receives a filtering configuration for the application data from a DN application executing on the algorithm entity, the filtering configuration being based on network configuration information sent from the base station to the algorithm entity; filters the application data according to the filtering configuration; and transmits the filtered application data to the algorithm entity.

According to another further aspect of the disclosure, there is provided a base station operating for radio access network operation in a telecommunication system, the base station configured to: transmit network configuration information from the base station to a Data Network, DN; execute the network configuration information by a DN application residing on an algorithm entity in the DN (for example, configure the network according to a preferred network configuration determined by the DN application); receive a filtering configuration from the DN application based on the network configuration information; transmit the filtering configuration to a User Equipment (UE) that accesses the telecommunication system;
receive filtered application data from the UE, the filtered application data is filtered based on the filtering configuration; transmitting the filtered application data to the algorithm entity in the DN.

In one embodiment, the base station may be configured to: transmit network configuration information for transmission of application date from a UE application executing on the UE to a DN application executing on the algorithm entity; receive a filtering configuration based on the network configuration information from the DN application and transmit the filtering configuration to the UE for use in filtering the application data before transmission to the algorithm entity; and to receive the filtered application data and transmit it on to the algorithm entity. Hence the base station may comprise a transmitter and a receiver (and a processor and memory to execute the usual base station functions such as resource allocation)

According to a final aspect of the disclosure, there is provided a method for radio access network operation of a base station in a telecommunication system, the method comprising: transmitting network configuration information from the base station to a Data Network, DN; executing the network configuration information by a DN application residing on an algorithm entity in the DN; receiving a filtering configuration from the DN application based on the network configuration information; transmitting the filtering configuration to a User Equipment (UE) that accesses the telecommunication system; receiving filtered application data from the UE, the filtered application data is filtered based on the filtering configuration; transmitting the filtered application data to the algorithm entity in the DN.

In one embodiment, a method in a base station comprises: transmitting network configuration information for transmission of application date from a UE application executing on the UE to a DN application executing on an algorithm entity; receiving a filtering configuration based on the network configuration information from the DN application; transmitting the filtering configuration to the UE for use in filtering the application data before transmission to the algorithm entity; and receiving the filtered application data and transmitting it on to the algorithm entity.

A UE/system/base station according to preferred embodiments of the present disclosure may comprise any combination of the previous method aspects. Methods according to disclosure embodiments may be described as computer-implemented in that they require processing and memory capability.

The apparatus according to preferred embodiments is described as configured or arranged to carry out certain functions. This configuration or arrangement could be by use of hardware or middleware or any other suitable system. In preferred embodiments, the configuration or arrangement is by software.

According to a further aspect there is provided a computer program comprising instructions which when executed by the UE or base station or network configures the base station or network to carry out the method steps according to any of the preceding method definitions or any combination thereof. The computer program may be stored on a non-transitory computer-readable medium.

In general, the hardware mentioned may comprise elements configured or arranged to provide the functions defined. For example, this hardware may include a receiver, a transmitter (or a combined transceiver), a processor, memory/storage medium, a user interface and other hardware components generally found in a terminal.

The disclosure may be implemented in digital electronic circuitry, or in computer hardware, firmware, software, or in combinations of them. The disclosure may be implemented as a computer program or computer program product, i.e., a computer program tangibly embodied in a non-transitory information carrier, e.g., in a machine-readable storage device or in a propagated signal, for execution by, or to control the operation of, one or more hardware modules. A computer program may be in the form of a stand-alone program, a computer program portion or more than one computer program and may be written in any form of programming language, including compiled or interpreted languages, and it may be deployed in any form, including as a stand-alone program or as a module, component, subroutine, or other unit suitable for use in a data processing environment. A computer program may be deployed to be executed on one module or on multiple modules at one site or distributed across multiple sites on the vehicle or in the back-end system and interconnected by a communication network.

Method steps of the disclosure may be performed by one or more programmable processors executing a computer program to perform functions of the disclosure by operating on input data and generating output data.

The disclosure is described in terms of particular embodiments. Other embodiments are within the scope of the following claims. For example, the steps of the disclosure may be performed in a different order and still achieve desirable results.

BRIEF DESCRIPTION OF THE DRAWINGS

Reference is made, by way of example only, to the accompanying drawings in which.

DETAILED DESCRIPTION

Methods described herein address use cases where configuration of specific AI or other algorithms may be controlled to adapt to particular requirements relevant to the type of data being transferred either in the uplink (UL) or the downlink (DL).

This may be referred to as (AI) Application filtering control and allows efficient transfer of application data to provide efficient RAN operation, maximising radio efficiency and enabling enhanced analytics operation with reduced data processing.

In one example, a measurement module in a RAN collects channel quality measurements for the beams used to serve a UE. A training module on the cloud (linked to the RAN) generates a machine learning (ML) model based on the channel quality measurements. A prediction module using algorithms based on the ML model is used to select the beam(s) used to serve the UE.

This is an example of how ML techniques are applied to problems such as the antenna beam selection problem when MIMO (Multiple Input Multiple Output) technology is used in a 5G radio (base station).

Typically in an ML system like the one described above, inference occurs after training has occurred. Training creates a model used to classify data and make predictions, such as the most efficient beam pattern, for example. Inference requires less computing resources and bandwidth than training and takes place after training using smaller batches of real-time data which is transferred across the RAN and quickly producing a correct prediction based on the data.

Methods disclosed herein model (view) the ML training and inference as filtering and processing in the AI Application. This division allows movement of some of the training or inference type of processing into different physical nodes in the system. Filtering may be seen as part of the processing of the ML algorithm in which not all data is needed to perform the required data prediction. Some data is filtered out and not used in the processing step, for example the inference step which provides the prediction.

The methods introduce network-controlled configuration of (AI) application data filtering to process the data streams to/from the application(s) in the system. One advantage of controlling filtering of application data using network signalling is that the needs of the application are more tightly coupled with the capabilities and available resources of the devices transferring the application data over a wireless interface. For example, video processing applications which can send high data rate streams to pattern recognition AI applications could reduce the amount of application data streams by controlling the filtering of the application data. The advantage of this would be the reduced processing needs of the devices used for the transfer of the data over the wireless interface.

Figure 2:
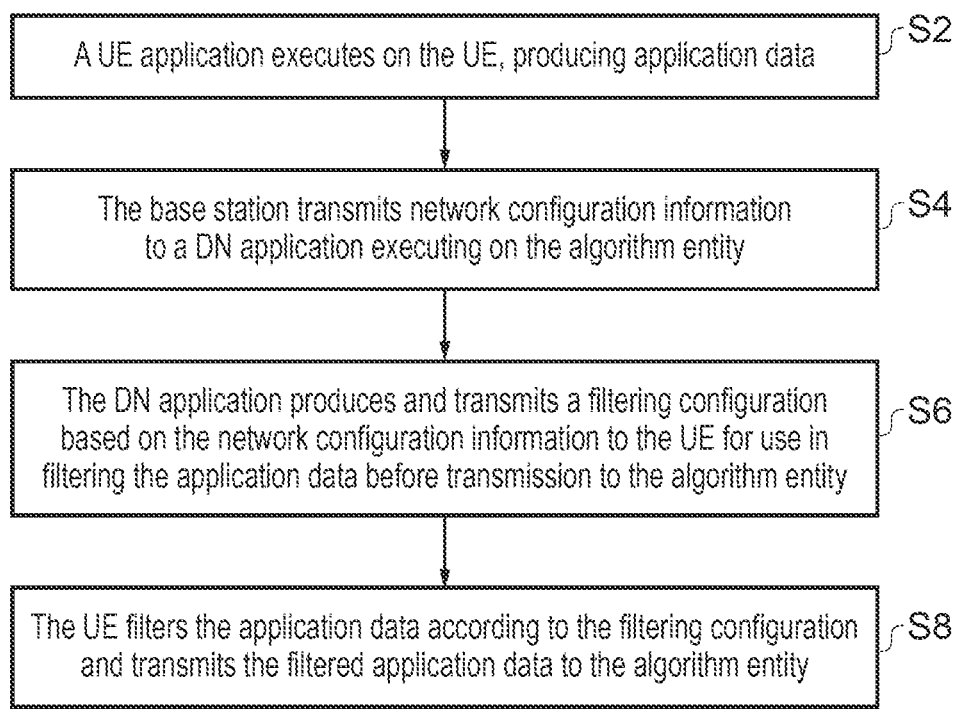
FIG. 2 is a flow diagram illustrating a method in a wireless communication network.

FIG. 2 shows a flow diagram of a method according to a general embodiment in a telecommunications system accessed by a User Equipment, UE, and including a base station, a connection from the UE to a Data Network, DN, via the base station, and an algorithm entity on the DN. At optional step S2, (and outside the main system defined above) a UE application (such as a data-collecting application for use with an overall AI application on the DN), executes on the UE, producing application data. At step S4, the base station transmits network configuration information to an application executing on the algorithm entity, which is within the DN part of the system. At step S6, The DN application produces and transmits a filtering configuration based on the network configuration information to the UE for use in filtering the application data before transmission to the algorithm entity. Finally, at step S8, the UE has filtered the application data according to the filtering configuration and the connection/UE transmits the filtered application data to the algorithm entity.

Filtering herein implies that the application (UP and/or DL) data is reduced in data volume by removing redundant information, for transmission through the (R)AN.

Generic types of filtering include:
1. Control of amount of data information by removal of non-essential information
2. Compression of data (this may be lossless compression like zip, or lossy data compression such as jpeg etc.)
3. Related to compression but more connected to ML is feature space vector extraction
4. Statistical techniques such as Bayesian approaches (updating a hypothesis as more data becomes available)
5. Pattern matching, where data is checked for a given sequence of tokens to detect a given pattern.

For example, in the case of a video surveillance camera, the filtering function may be set up so that only video frames that match particular pre-defined criteria are passed on to the ML part of the AI Application. Other examples may be, for example, the GPS location data from an application, which may be filtered to be passed on to the AI Application only when it changes by a pre-determined amount. Another example of feature extraction could be edge detection of video data.

Other examples enabled by the methods herein include the use of multiple UEs or modems connected to a Data Network. Typically, there needs to be efficient control of the filtering for all the devices connected to the network. This control may be facilitated by the use of signalling sent through the same radio interface as used for the transfer of the application data.

The general approach is shown in FIGS. 3 to 6, 8 and 9 which are used to indicate the existing state of the art control and highlight the innovative elements disclosed herein. In the following examples the application (or any such device containing an application) is connected to the UE or MTC terminal modem (baseband modulation and demodulation functionality) that supplies data (which may be DL and/or UL) to the AI algorithm which shown as an entity connected to the Data Network (DN) and communicating with the AI application on the device/UE. The features refer specifically to an AI application, but are equally applicable to other algorithms which may require intensive use of bandwidth in the RAN. Filtering is shown as part of the AI Application, and as explained herein, this could be present within the UE modem or elsewhere.

Figure 3:
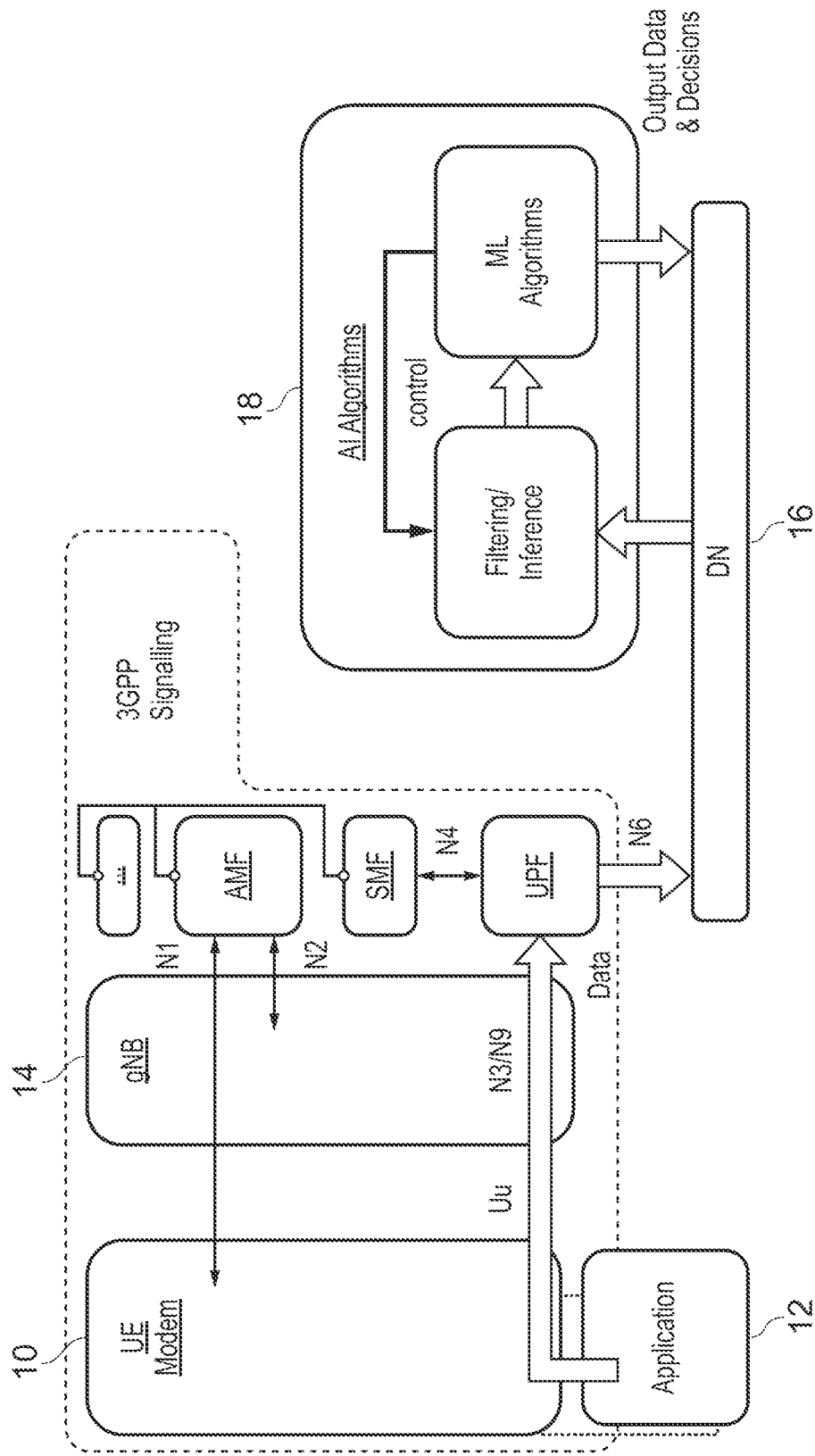
FIG. 3 is a block diagram of existing AI application processing using a UE feeding data to an algorithm entity.

The following description begins with a description of the current state of the art for this type of ML application data processing from a UE/Modem connected to a wireless network, as shown in FIG. 3.

Figure 1:
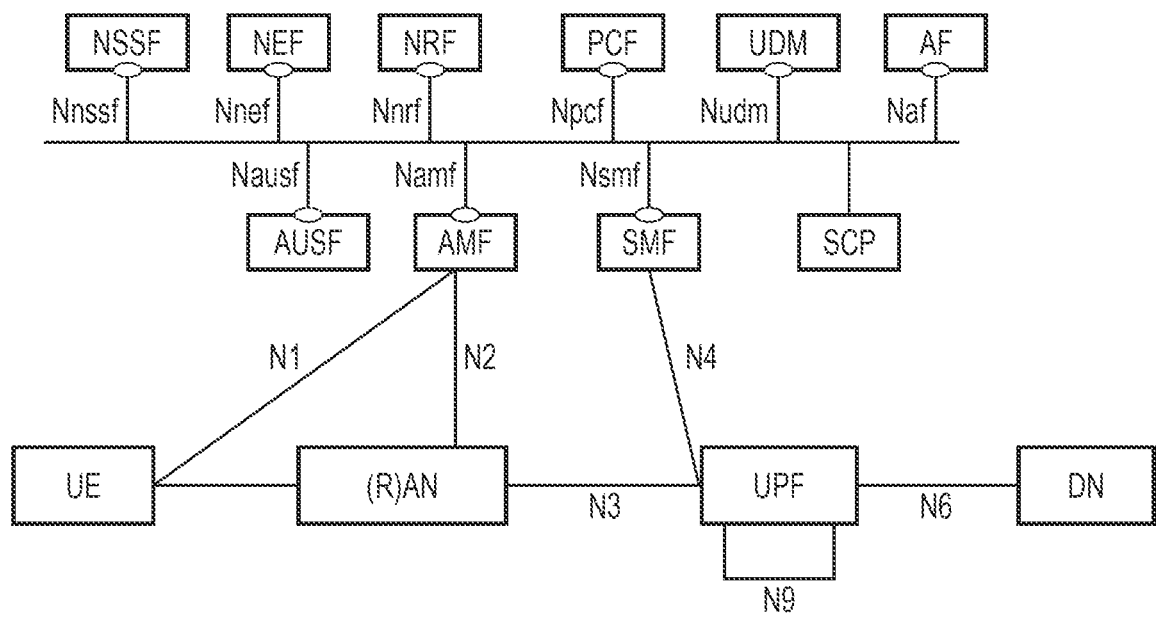
FIG. 1 is a conceptual diagram of 5G core architecture

In FIGS. 3 to 6, 8 and 9 the UE/modem 10 is shown to the left in the 3GPP signalling block, with its AI or ML application 12. In this Figure, the UE/Modem may be a user terminal (e.g. mobile phone) or a modem (e.g. communications module as part of MTC). The gNB base station 14 is shown in the centre of the 3GPP block, with the UPF, SMF, AMF, NEF and other network functions shown to the right. The gNB connects with the UE over the Uu interface and the other interfaces are as described in FIG. 1. The AI application 18 in the DN 16 is shown linked to the UPF over the N6 interface and to the NEF for UE capability/context management. Data flow is shown in thicker arrows and control signalling in thinner arrows. Incidentally, the AI applications on the UE and DN may be viewed as part of the same distributed application or separate applications. In either case they cooperate in the sense that the application on the UE supplies data to (and receives data from) the application on the DN, which is in connection with or incorporates the AI algorithms.

The AI algorithms entity 18 (shown communicating via the DN) is a programmed server or other computing device which may include the overall AI application and/or the part of the AI application executing the AI algorithms. It receives the data from the UE or application attached to the UE or any other connected network device and typically filters the data and processes the data using ML algorithms looking for specific patterns or trends in the data. The output of the ML algorithms, shown with a downward arrow from the ML algorithms, will typically be processed data and/or decisions taken on the input data (such as classification). The output data & decisions will typically be further processed and acted on by an application, as shown by the arrows connecting the AI Algorithms to the application in the DN.

Figure 4:
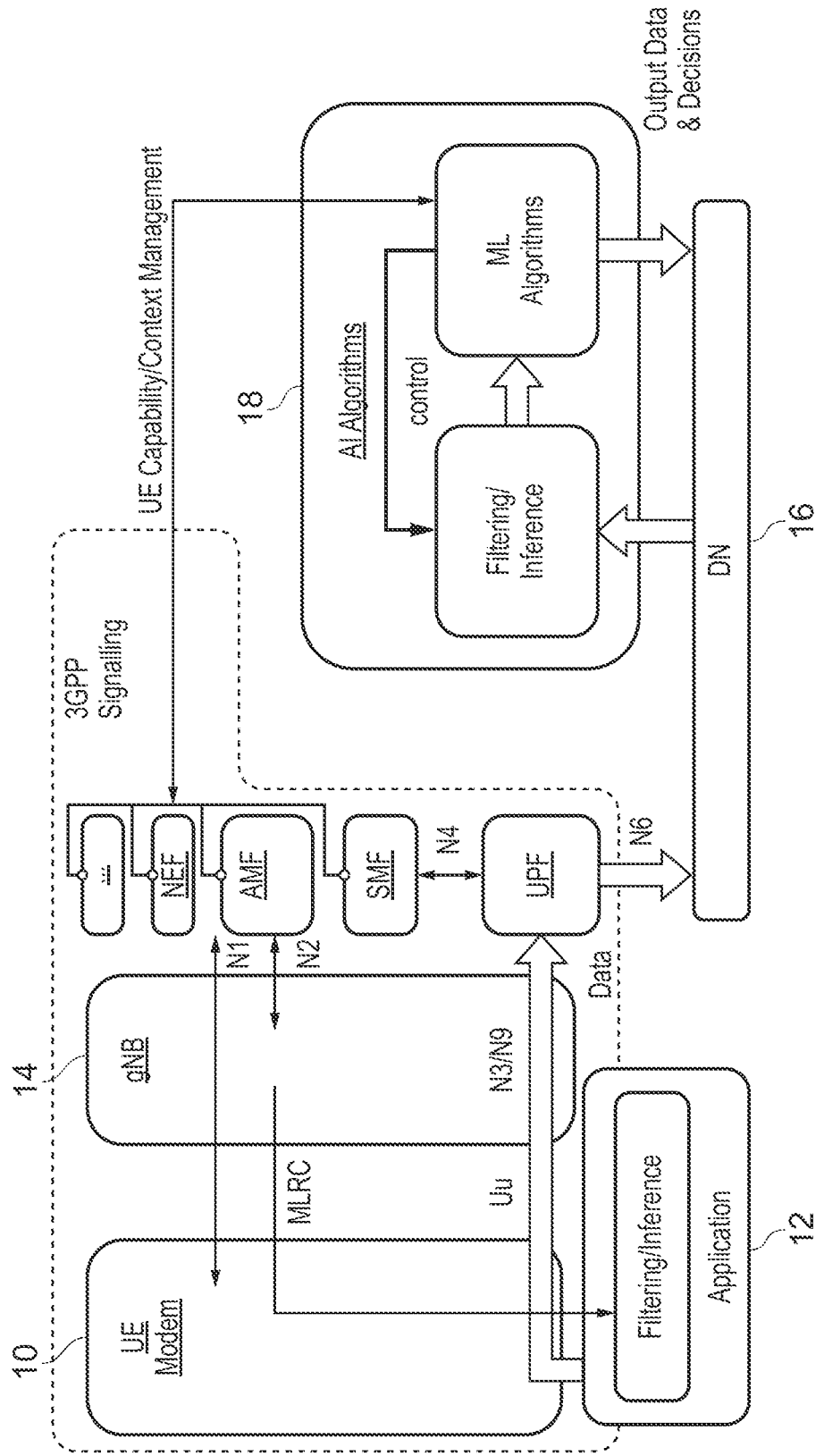
FIG. 4 is a block diagram of the same components as FIG. 3, showing an AI data filtering configuration in the UE as well as in the algorithm entity.

The new interactions between the AI application and 3GPP 5G core network are first shown in FIG. 4. Here, the AI algorithms interact by sending of filtering control information from the ML algorithms through the 3GPP network directly to the filtering configuration in the application on the UE. In this new arrangement the transfer of the filtering control over the radio interface is identified as MLRC (Machine Learning Resource Control) which is a new type of RRC. This traffic is shown as being delivered by the gNB to the UE. Delivery of this MLRC is also possible by using higher layer application layer signalling carried by the radio link as user data. The gNB could optionally send this data to the UE using NAS (Non Application Stratum) signalling. This kind of signalling is typically used to transfer the non radio-related information and parameters to the UE. NAS information typically comes from the AMF in the 5GC. One advantage of using a new (RRC-like) UE-specific control signalling channel for this information is that data integrity and delivery is guaranteed.

The UE nwk cfg. (Network configuration) is transferred from the 5GC SMF (Session Management Function) also potentially using NAS signalling. to the AI algorithm entity (such as a server programmed to carry out an overall AI application using data from the AI application(s) in any connected UE).

Figure 4A:
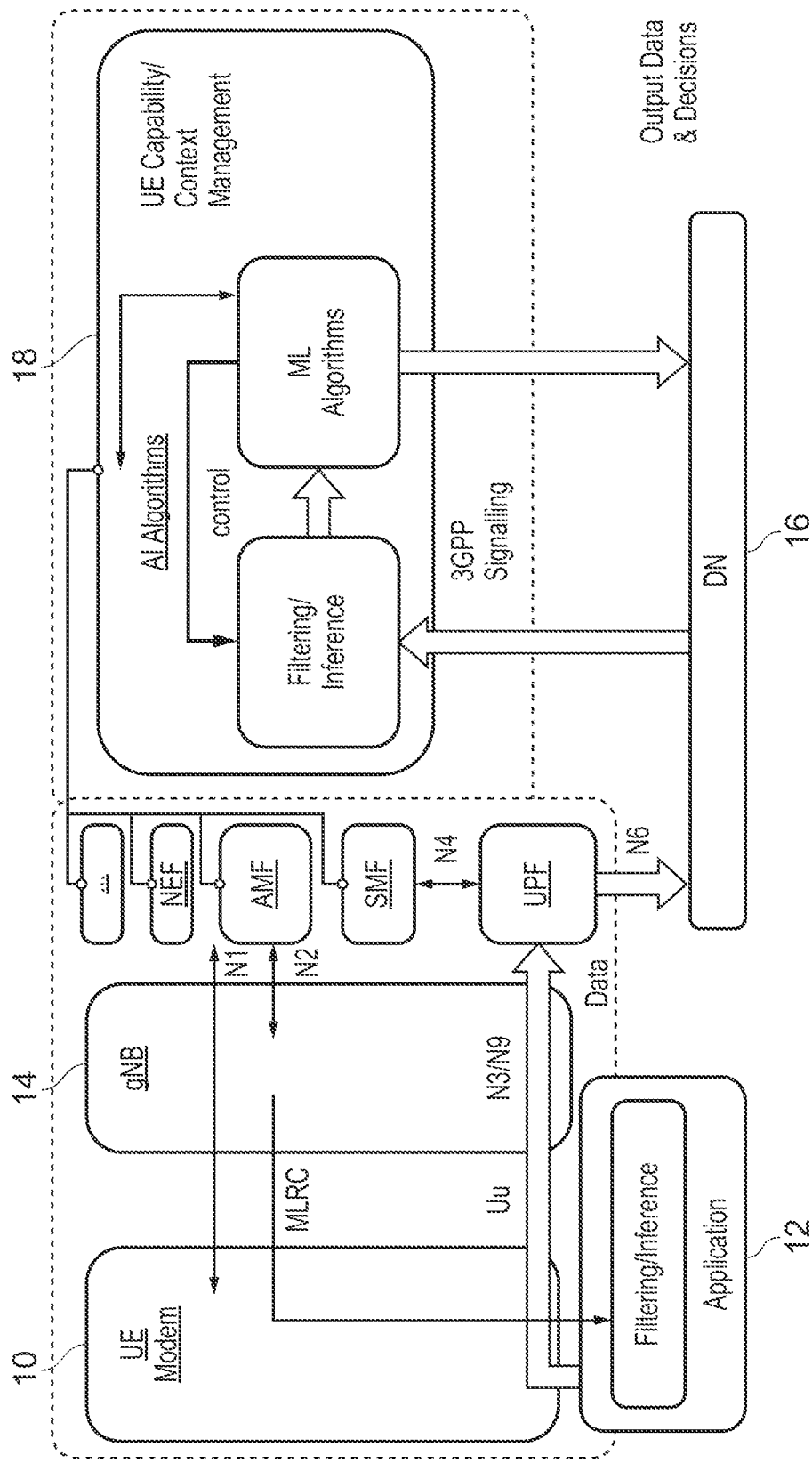
FIG. 4a is a block diagram of the same components as FIG. 3, showing an AI data filtering configuration in the UE as well as in the algorithm entity, which is part of the 5GC (5G core)

FIG. 4a shows the AI entity as part of the 5GC 3GPP system. The AI entity 18 acts in UE capability/context management and is connected directly to the other network functions and via 3GPP signalling to the DN 16. Other aspects are unchanged vis-à-vis FIG. 4.

This UE nwk cfg. (Network configuration) and capabilities might include, for example, details of the discontinuous reception (DRX) parameters for a particular UE. These parameters may be used by the UE to send data in a given fixed known pattern without the need for the control channel overhead of frequent resource requests. Accordingly, one benefit of these methods may be in improving the filtering of data in dependence upon the allowed traffic characteristics available for the transfer of the application data over the air interface. In this context capability may refer to the UE capability (i.e. what it is capable of providing in terms of services, support for features etc.) and configuration may refer to the signalling to the UE to instruct the UE to operate in a defined way. Examples of configuration and capabilities include:

Radio parameters such as available bands
Configuration of BSR (Buffer Status reporting)
Configuration of PHR reporting (Power Headroom Reporting)
Configuration of Measurements for reporting of signal strength measurements for facilitating handover to different cells
Details of UE/PDCP context information (including radio bearer information)
CN Parameters such as details of Slicing These examples may be used in both the training phase of the ML algorithms in the AI application and in the inference/filtering phase. For example, for training there may be different requirements for bandwidth/latency and the ML algorithm may adjust to make the best use of the reported configuration capabilities.

In addition, further steps could include the AI Application requesting information from the UE (either directly or via the gNB). The direct contact would be by the NEF function in the 5GC or directly if the AI entity is directly connected to 5GC as mentioned above. Such an information request may relate to network configuration: details of the network configuration may be used as mentioned above to adjust the ML algorithm.

Figure 5:
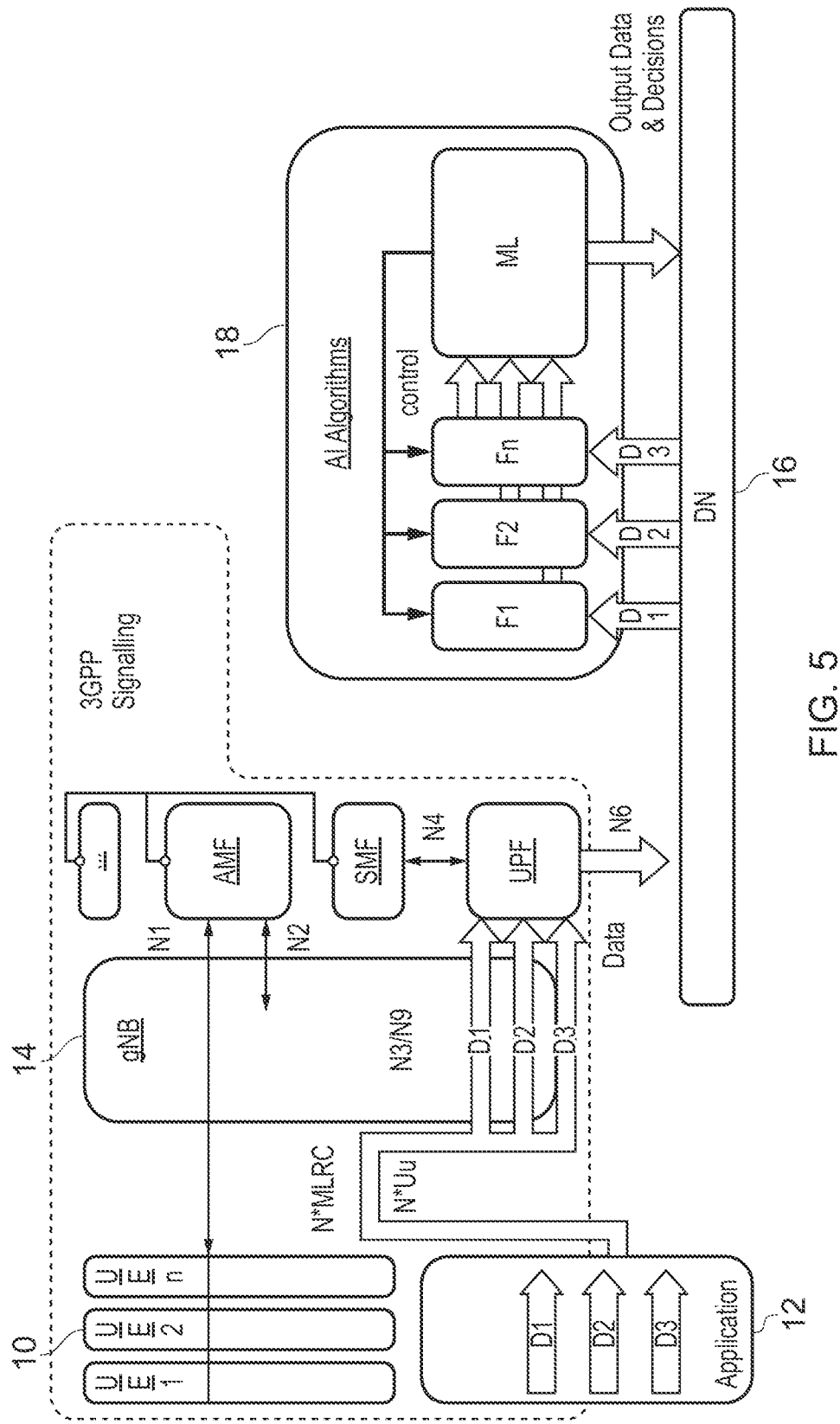
FIG. 5 is a block diagram of the same components as FIG. 3, showing a training phase before filtering is added in the UE application and with multiple UEs.

In a further refinement FIG. 5 shows how multiple UEs may supply application data (shown in the D1 to D3 arrows, one per UE) across the 3GPP system to the AI algorithm entity, which will then typically train the ML algorithms with control signalling used to tune filtering. Here, the application at the UE side is shown as a single application but executes individually on each of a plurality of UEs.

Examples of the multiple devices that generate a stream of device application data include such devices as video surveillance cameras. In this case some or all video data (with optional compression) that match a particular pre-defined criterion may be passed on to a determination application in the AI entity determining the radio resources to be allocated (not shown here). The determination application may be part of the AI application or AI entity, or it may be provided as a separate program. Additionally, other information streams may be sent at the same time include location data (either from internal GPS or other means) which are also used in the determination application in the AI entity together with the video data. Other additional sensor inputs such as temperature data, light sensor, motion detection, etc. may also be sent. These are all as examples of the types of data that would be useful in the determination application. The frequency and duration of the streams of application data depend on the constraints computed by the determination application. For instance, if the multiple devices and sensors are configured as part of a video surveillance system then motion detection may determine the update rate of the stream of video frames sent by the UE to the base station operating on a RAT. The determination of the required radio resources may be then be computed by the determination application to best match the particular application data streams that are configurable at any given time or may be needed in the future. In particular, different radio resources may be made available to a given UE (or groups of UEs, if multiple applications are streamed from separate devices) by the application of a given network configuration.

Many UEs may provide streams (together) at a given time. The different types of radio resources available may include the configuration of radio bearers with different QoS (Quality of Service) characteristics. These characteristics could include:

Minimum data rate
Maximum data rate
Latency
Error rate
Packet delay variation
Out of order delivery
Packet loss Other examples may be for example the GPS location data from an application, which may be filtered to be passed on to the AI application only when the required network configuration is available in the UE.

The AI application in the AI entity may apply different filtering control for different phases of treatment of the application data streams. In this scenario the AI application may require a different set of radio resources for a given Machine Learning (ML) algorithm, which includes a training phase before an inference phase. The training phase of the ML may optionally select much higher bandwidth data stream capabilities for a given time in order to train the ML part of the application. This may be achieved by the choice of a preferred network configuration.

The determination application may be provided for this purpose of choosing a preferred network configuration which is suitable for the current phase. The determination application may, for example, receive a plurality of possible network configurations from the gNB or SMF/UPF and determine at least one preferred network configuration associated with the transfer of the application data between the terminal and the base station. If selection is required (more than one configuration is determined), the base station may select a network configuration from the at least one preferred network configuration. The determination application may have access to (or may have undergone a learning phase to incorporate) historical device application data and chose one or more preferred network configurations in dependence upon the type of data transfer required by the device application.

The terminal may transfer device application data to the determination application via the base station. This transfer may involve processing at the base station, or the base station may simply relay the data. The determination application, in determining the preferred network configuration(s) may use this device application data and may employ various means of computational analysis. For example, the determination application may use AI methods such as machine learning (ML) algorithms, which are suitable for identifying patterns and employing inference methods upon large, varied data sets.

The network configuration that is selected by the base station in the network may set a triggering condition for device application data reporting from the terminal. Thus, the network configuration may determine when data is sent. In this way, the determination application may be indirectly in full control of when data is transferred (between UE and gNB) but only in a manner that is allowed by the set of possible configurations sent from the gNB to the determination application. This step (the gNB deciding the possible configurations) may lead to optimum power saving throughout the radio transfer operation.

The possible network configurations that are provided by the base station to the determination application may be provided as a set of available configurations. Alternatively, the possible network configurations may be provided as a list of parameters with, for example, optional ranges of values that are deemed by the base station to be suitable for communication. In this way, the determination application may only take into consideration network configurations that consider the demands of the device application itself (knowledge that the base station will possess at the time of providing possible network configurations).

The determination application data may store such transmission parameters of the device application data as QoS, data rate and periodicity, for use in determining the preferred network configuration. Such transmission parameters may be explicitly reported by the terminal or the base station, or they may be implicitly determined following receipt of application data.

The preferred network configurations that are provided by the determination application to the base station may again be provided as a set of available configurations. Alternatively, the preferred network configurations may be provided as a list of parameters with, for example, optional ranges of values that are deemed by the determination application to be suitable for communication. If a plurality of preferred network configurations is provided, the base station may make the final selection for the network configuration and the base station may report the selected network configuration back to the determination application. In this way, the determination application may be notified of an acceptable network configuration and may use this information to inform its decision making in future instances of providing preferred network configuration. That is, this procedure may be seen as a means of reinforcement learning. If there is a single preferred network configuration, the base station may simply check that it is still a possible/suitable configuration, and if so select the single preferred network configuration or if not, then restart the method, for example by re-signalling to the determination application updated possible network configurations.

The filtering control information may be transferred over the 3GPP network to the group of UEs that are used in this particular application. As shown in FIG. 5 the multiple data streams (for example D1, D2, D3) may be optionally sent from multiple (here 3) UEs connected to one or possibly multiple base stations. As also shown in FIG. 5, the data may be separated within the gNB into different flows connected to the UPF (or effectively remain separate, since it originates from different UEs), however it is also possible that the data is combined in the gNB (effectively multiplexed) into a common singular data flow for subsequent processing.

Figure 6:
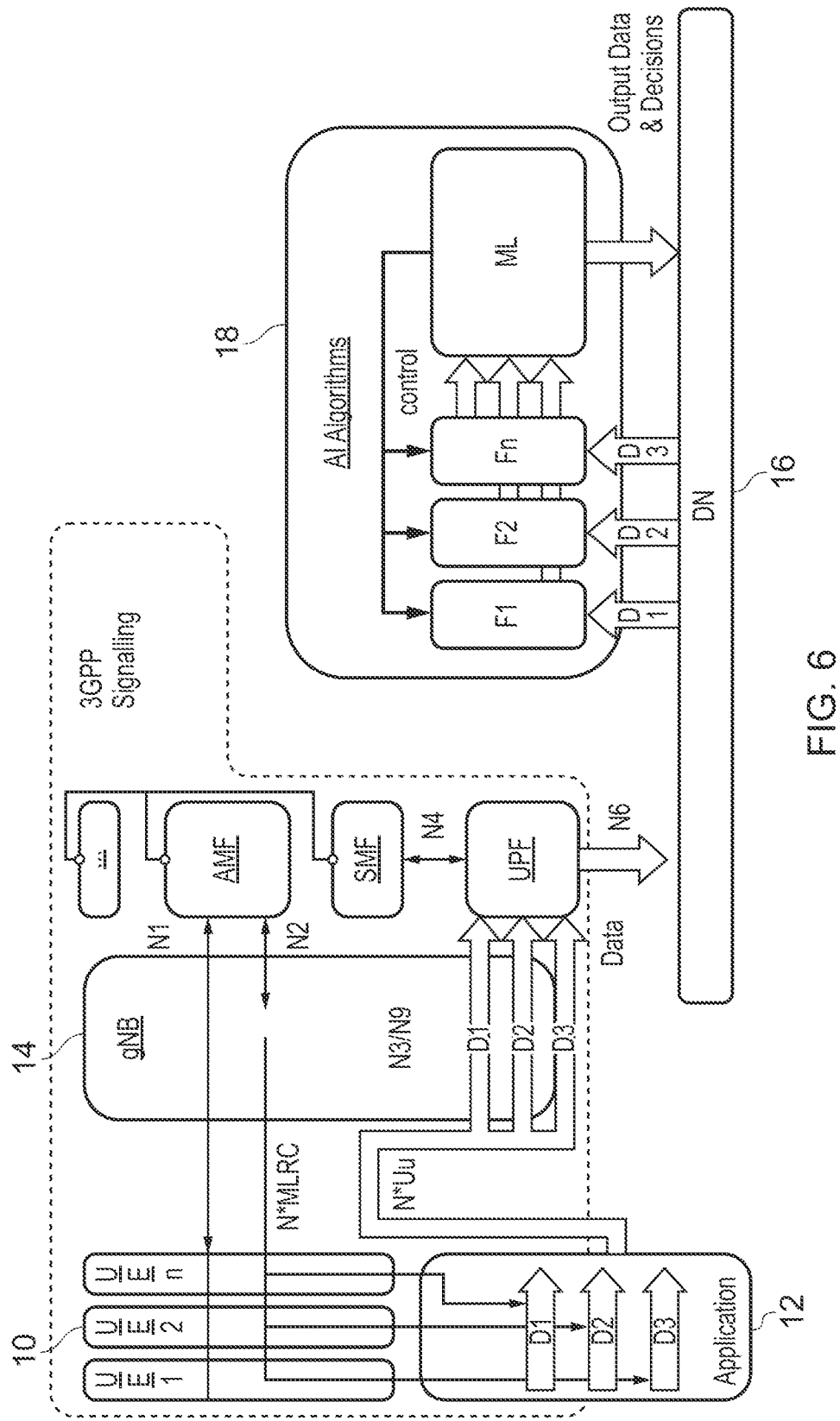
FIG. 6 is a block diagram showing the training phase of FIG. 5, with a further indication of SMF control of UE filtering.

This data combination and separation is also shown in FIG. 6, which includes further signalling arrows. Combined multiple data streams (D1, D2, D3) are separated into individual streams in the gNB. Typically, this kind of configuration is best controlled by the SMF (session management function) so as to directly allow the most appropriate radio bearer configuration for the raw data transfer.

Figure 8:
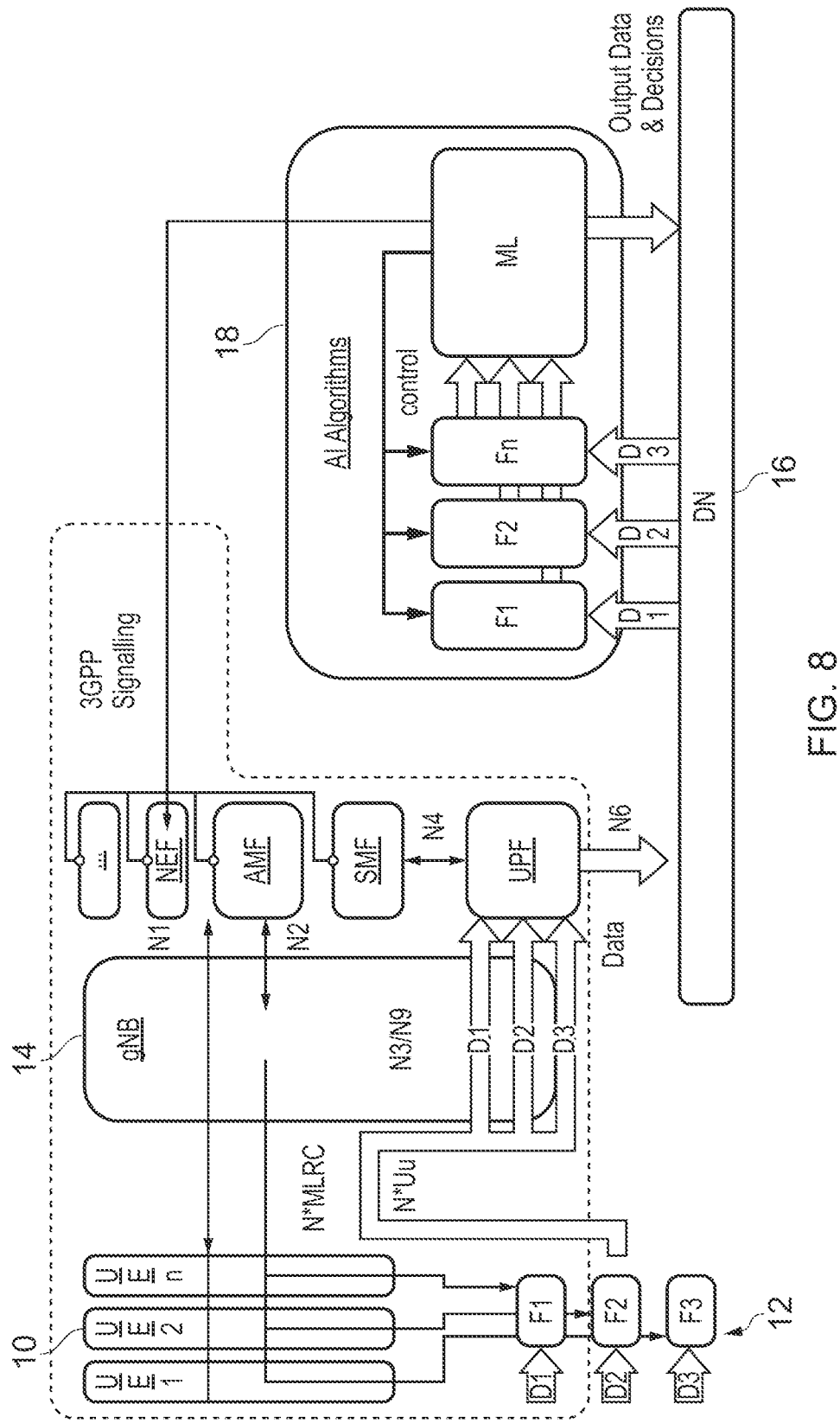
FIG. 8 is a block diagram of the same components as FIGS. 5 and 6, in which filtering has been added to the device (UE) application.

After initial training it is then expected that the filtering of the individual data streams may be transferred onto the application running locally on the UE or group of UE as shown in FIG. 8 (described later).

Figure 7:
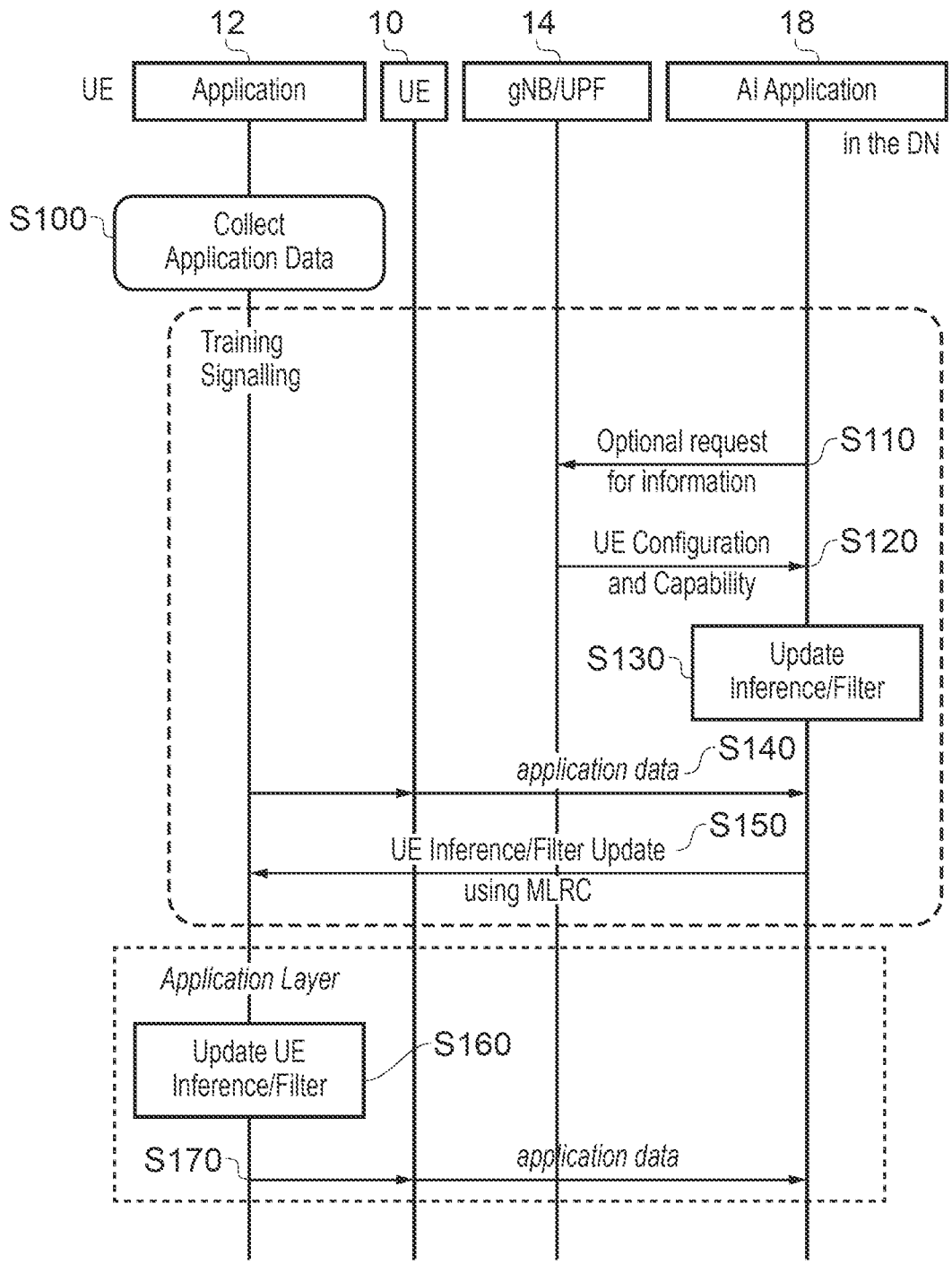
FIG. 7 is a signalling diagram of a method in a wireless communication network, in the training phase of the filtering mechanism.

A typical flow of information between the applications connected to the DN and in the UE is shown in FIG. 7 in 5G terminology but may be applied to any suitable RAT. This diagram of the training phase shows how the application data may be processed before filter update information is transferred to the UE.

In S100 application data may be collected by the application running on the UE and stored in a UE buffer before transfer, for use in the AI application on the DN. At this point a data filter may already exist within the application on the UE, to adapt the data to the resources available for transmission to the DN, for example from previous use of the application In signalling training, in S110, optionally the AI application on the DN sends a request for UE configuration and capability information. Typically, this request might be sent when the UE first connects to the gNB (moving from IDLE mode to connected mode) normally as part of UE connection procedures. Then in S120, the base station sends the UE configuration and capability to the AI application. It is possible that the UE capability is stored in the network for future use, but this is optional for the network, so the UE capability may have been previously provided from the UE to the gNB or it may be already available at the gNB The AI application updates the inference processing based on the configuration information and specifically the filtering required in S130. This update is for the filtering in the AI entity, at the UE or, most likely, both. The update is carried out so that the application data is not being transferred whilst filter update occurs. The determination application may act to determine a preferred network configuration at the same time as the S130 update inference/filter. Application data is transferred from the UE application to the AI application (via the base station) in S140. Then the UE part of the inference, in the form of filtering is instructed, for example using MLRC, in S150. The preferred network configuration may be sent at the same time as S150. The order of S140 and S150 may be reversed, to allow the update before the transfer of application data continues, as mentioned above.

In the application layer in the UE, the filter for the application data is updated in S160 (started if it was not already running), and then further application data is sent in S170 from the UE to the AI entity.

FIG. 8 shows the transfer of the result of the training phase for the filtering in the individual application running across potentially many UEs, shown here with the number of UEs, X=3. Filtering (shown as FX) is applied to the data stream DX in each UE. When operated in this way there are potentially many different means of transferring this information across the 3GPP network, including one-to-one mapping of the information and one-to-many transmission. The advantage of using the 3GPP system for the distribution of this information is that the SMF and/or gNB may decide on the optimum mode of transfer depending on the individual radio links available for the different UEs providing connection of the application data to the AI algorithms. For example, the gNB or SMF may provide the determination application mentioned previously with one or more suitable configurations.

When SMF is controlling the different filters (F1 . . . F3) in the above architecture, the method for the control may optionally include such methods as:

One to One control (one configuration and control signal per application filtering)

One to many control (Broadcast of configuration and control signal for all the instances of application filtering)

Figure 8A:
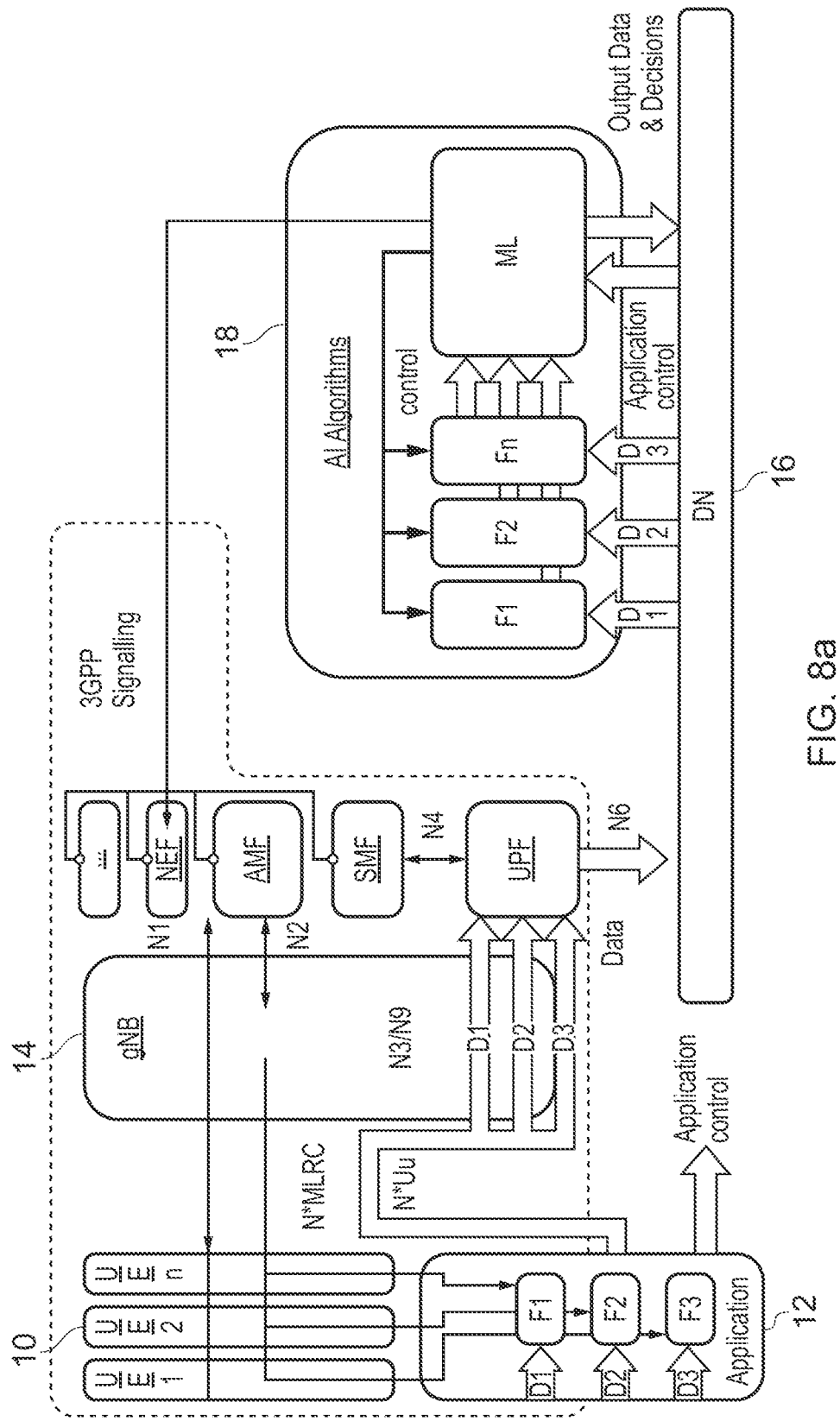
FIG. 8a is a block diagram of the same components as FIGS. 5 and 6, in which filtering has been added to the device (UE) application and reinforcement learning is used.

FIG. 8a also shows the possibility of using reinforcement learning by the tuning of the filtering present in the AI applications using an MLRC (machine learning resource control) interface. One example of this would be the tuning of the data compression based on specific data model updates in the ML part of the AI application. This could be achieved also by application control such as shown with the arrows from the UE and from the DN to the ML part of the AI algorithms, indicating that in addition, application data control is also transferred. Typically, this application layer control is the control information used within the application itself to control the behaviour and function of the application.

Figure 9:
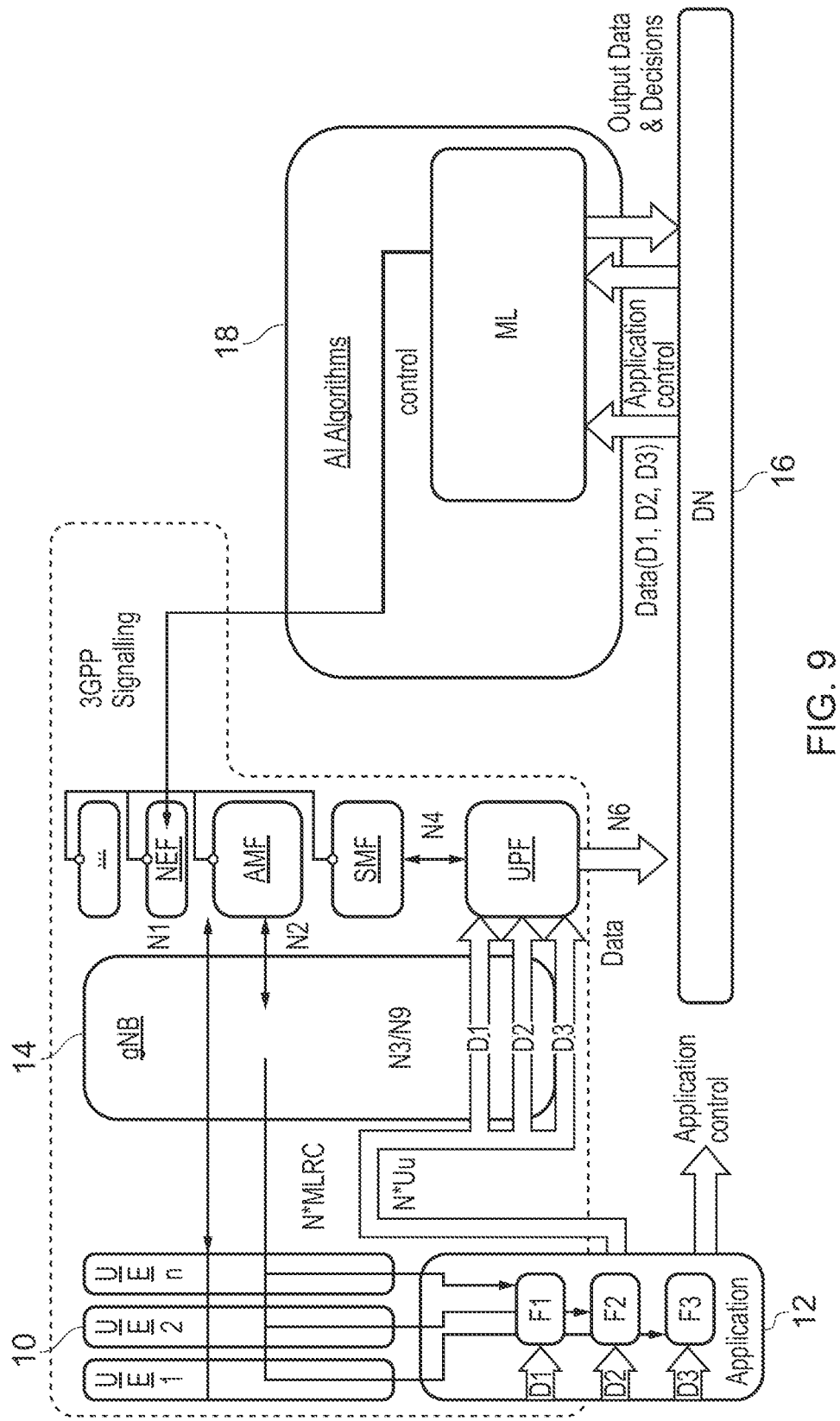
FIG. 9 shows the same components as FIGS. 5, 6 and 8, in an operation phase of filtering.

When the ML is operating after training then the filtering in the algorithm entity may not be needed as shown in FIG. 9 (which also shows reinforcement learning). Alternatively, it may be appropriate to lower the amount of filtering in the AI algorithms.

Figure 10:
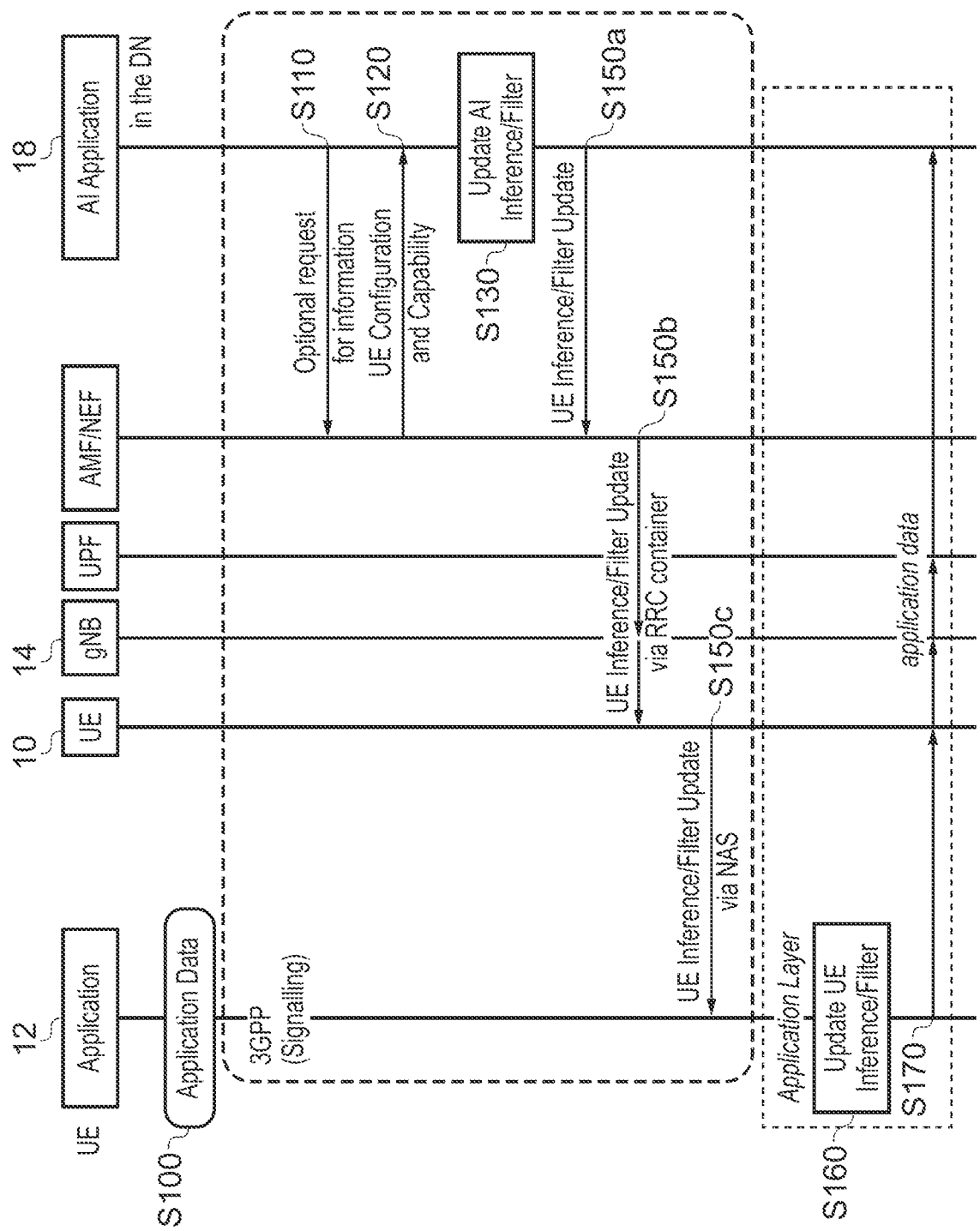
FIG. 10 is a signalling diagram of the method of FIG. 7, using RRC (Radio Resource Control) for inference/filter update signalling.

FIG. 10 includes a potential further refinement in the signal flow shown in FIG. 7. Only the changes to FIG. 7 are described below.

FIG. 10 shows that the application layer transfer of the UE inference/filter update signalling is from the AI application to the gNB and then uses RRC container (layer and protocol) with NAS (Non Access Stratum) data to send this direct to the application on the UE. Hence step S150 is divided into S150a which transfers the update from the algorithm entity to the gNB, step S150b which transfers the update via RRC container with NAS and step S150c, which applies the application filter update via NAS to the application on the UE.

Additionally, FIG. 10 omits the transmission of application data in S140, indicating that the transmission of application data may start after filtering has been applied.

Hardware Implementation

Figure 11:
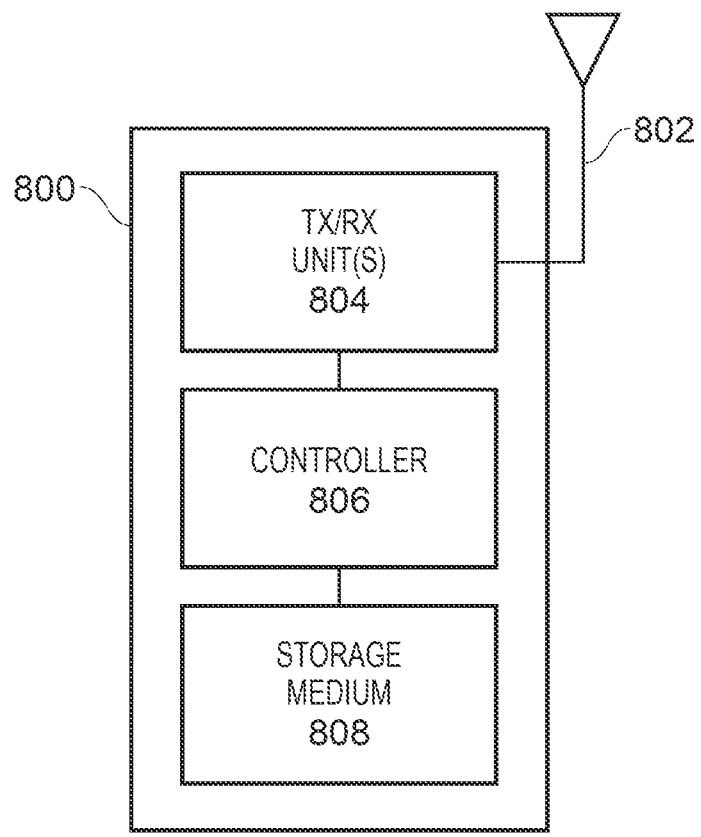
FIG. 11 is a hardware diagram showing the structure of a base station or UE.

FIG. 11 shows the hardware structure of a base station or UE 800 suitable for use with disclosure embodiments, including an antenna 802, transmission and reception unit(s) 804, a controller 806, and a storage medium or memory 808. Base station/UE 800 maybe an example of UE 10 or base station 14 in FIG. 2.

The base station or UE belongs to at least one RAT and the base station may, for example, be described as an eNB or take a NR/5G form and be described as a gNB. Other/different base stations may take any other form of a different RAT as long as they are suitable for transmitting and receiving signals from other stations.

In any embodiment, the controller 806 may be, for example, a microprocessor, digital signal processor (DSP), application-specific integrated circuit (ASIC), field-programmable gate array (FPGA), or other logic circuitry programmed or otherwise configured to perform the various functions described above. For example, the various functions described above may be embodied in the form of a computer program stored in the storage medium 808 and executed by the controller 806.

Figure 12:
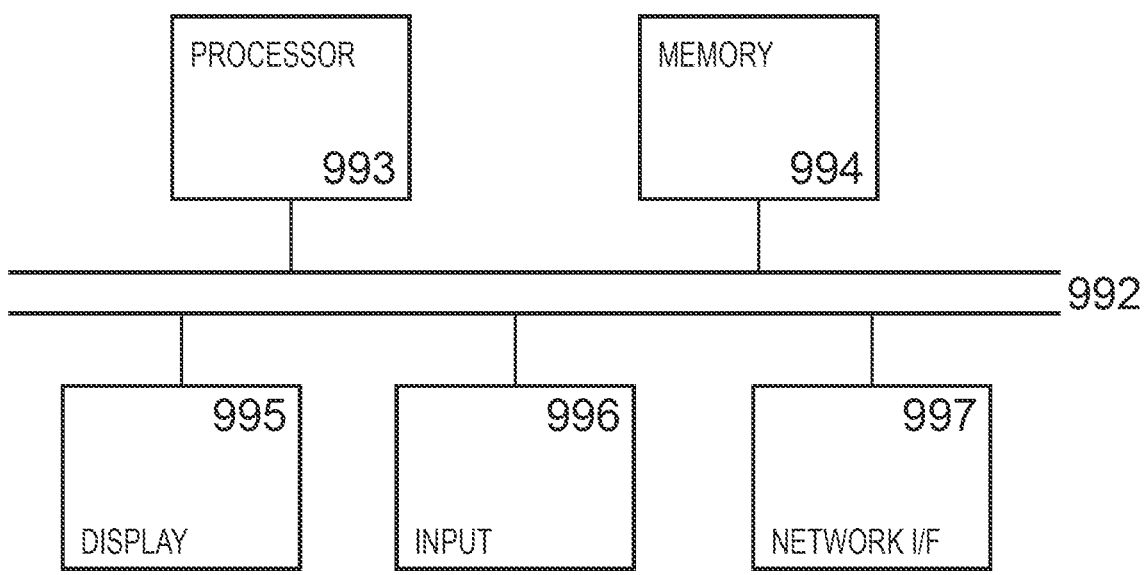
FIG. 12 is a block diagram of a computing device, such as a server, on which an algorithmic application and/or determination application may execute.

FIG. 12 is a block diagram of a computing device which may be used to implement the functions of the algorithm entity in methods in a telecommunications system as described herein. For example, the computing device may store and run an AI application and/or a determination application shown in the AI algorithms block on the DN in FIG. 3. The computing device comprises a processor 993, and memory, 994. Optionally, the computing device also includes a network interface 997 for communication with other computing devices, for example with other computing devices of disclosure embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, a term which may refer to a single medium or multiple media (e.g., a centralised or distributed database and/or associated caches and servers) configured to carry computer-executable instructions or have data structures stored thereon. Computer-executable instructions may include, for example, instructions and data accessible by and causing a general-purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of running a complex algorithm using data from one or more UEs and/or determining the resources to be used for transmission of data to/from those UEs as described here and in the claims.

The memory 994 may store data being read and written by the processor 993, for example data from AI applications executing on the UEs and/or data corresponding to network configuration. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The network interface (network I/F) 997 may be connected to a network, such as the DN as part of the Internet, and is connectable to other such computing devices via the network. The network I/F 997 may control data input/output from/to other apparatus via the network.

The (AI) algorithm application and/or determination application shown in the Figures in the DN may be a processor 993 (or plurality thereof) executing processing instructions (a program) stored on a memory 994 and exchanging data with the base station via a network I/F 997. In particular, the processor 993 may execute processing instructions to receive, via the network I/F, data and/or possible network configurations from the base station and to determine at least one preferred network configuration from the possible network configurations and report the preferred network configurations to the base station, for use in the application on the UE.

Methods embodying aspects of the present disclosure may be carried out on a computing device such as that illustrated in FIG. 12. Such a computing device need not have every component illustrated in FIG. 12 and may be composed of a subset of those components. A method embodying aspects of the present disclosure may be carried out by a single computing device in communication with one or more data storage servers via a network. The computing device may be a data storage itself storing and processing data and preferred and selected network configurations.

A method embodying aspects of the present disclosure may be carried out by a plurality of computing devices operating in cooperation with one another. One or more of the plurality of computing devices may be a data storage server storing at least a portion of the preferred and selected network configurations.

Methods relate to the transmission of control for training and/or subsequently inference (from a distinct data network connected entity) of application data filtering in the UE(s) to one or multiple UEs for a single AI or other algorithmic application.

Two new control interfaces may be provided:
network entity to the core network, such as the 5G core network (5GC), using 5GC NEF function
5GC to UE interface (this could use an existing interface such as RRC or application layer signalling)

Control signalling may be transferred either by AS or NAS and over a new or existing radio bearer.

Functionality may be used in a training phase and/or an inference phase, potentially with different filtering control. The functionality may be provided for multiple UEs and multiple UE filtering. It may include the application of reinforcement learning.

Arrangements may provide any of the following benefits.

Signalling in a wireless network supports optimisation of Inference/Filtering for AI/ML Applications. Methods use radio interface related filtering configuration to optimise AI/ML Applications running on single or multiple UEs.

The methods address disadvantages and limitations of current control of Inference/Filtering for AI/ML, which is not always able to efficiently match radio interface resource usage with the training and/or inference of the data flows in an application using AI/ML.

Inference/Filtering is specifically derived from the knowledge of radio interface resources for the diverse traffic flows to and from terminals. Methods address the case where the network may wish to control Inference/Filtering determined by the unique characteristics of the radio interface, such as latency, bit-rate and non-uniform data shaping. Methods support the use of ML algorithm(s) to enable optimum Inference/Filtering for AI/ML Applications are with respect to the determined characteristics of the traffic flows for a particular UE or groups of UEs supporting one application.

An aim is the reduction of resource use by AI applications by use of filtering.

What is claimed is:

1. A method in a telecommunications system including a Data Network, DN, a base station, a connection via the base station from the DN to a User Equipment, UE, executing a UE application producing application data, and an algorithm entity on the DN, wherein:
the base station transmits network configuration information to a DN application executing on the algorithm entity;
the DN application produces and transmits a filtering configuration based on the network configuration information to the UE for use in filtering the application data before transmission to the algorithm entity, allowing the UE to produce application data filtered according to the filtering configuration; and
the connection transmits the filtered application data to the algorithm entity.

2. The method according to claim 1, wherein the DN application is an Artificial Intelligence, AI, application and the application data produced by the UE is used in a training or an inference phase of the AI application.

3. The method according to claim 2, wherein the application data produced by the UE is used in both the training and inference phases of the AI application and the algorithm applies a different filtering configuration in each phase.

4. The method according to claim 2, wherein the algorithm entity initially carries out filtering as part of inference or training and the filtering at the algorithm entity is then at least partially transferred to the UE by the filtering configuration.

5. The method according to claim 2, wherein the filtering configuration is tuned during the training or inference phase.

6. The method according to claim 5, wherein the filtering configuration is tuned during the training or inference phase using reinforcement learning.

7. The method according to claim 1, wherein the algorithm entity includes a determination application which determines one or more preferred network configurations associated with the transfer of the application data between the UE and the base station, and sends the one or more preferred network configurations to the base station.

8. The method according to claim 7, wherein the one or more preferred network configurations are based on the network configuration information and/or based on the application data from the UE used in the DN application.

9. The method according to claim 7, wherein the algorithm entity receives a plurality of possible network configurations from the base station or a Session Management Function, SMF, and determines the one or more preferred network configurations from these possible network configurations.

10. The method according to claim 1, wherein the algorithm entity transmits a request for the network configuration information.

11. The method according to claim 1, wherein unfiltered application data is sent from the UE to the algorithm entity before the UE starts filtering.

12. The method according to claim 1, wherein the telecommunications system is connected to a plurality of UEs, each executing an instance of the UE application and wherein a data stream for each UE is either separated within the base station into different flows or combined within the base station into a common data flow.

13. The method according to claim 12, wherein a decision as to the combination or separation is controlled by the Session Management Function, SMF.

14. The method according to claim 1, wherein the filtering configuration is transmitted over the radio interface using a UE-specific control signalling channel and applies the filter via non-Access Stratum, NAS to the UE application or is transmitted over the radio interface using application layer signalling carried by the radio interface as user data.

15. The method according to claim 14, wherein the filtering configuration is transmitted over the radio interface using the UE-specific control signalling channel in the RRC layer.

16. A telecommunications system including a Data Network, DN, a base station, a connection via the base station from the DN to a User Equipment, UE, executing a UE application producing application data, and an algorithm entity on the DN, wherein:
    the base station is configured to transmit network configuration information to a DN application executing on the algorithm entity;
    the DN application is configured to produce and transmit a filtering configuration based on the network configuration information to the UE for use in filtering the application data before transmission to the algorithm entity, allowing the UE to filter the application data according to the filtering configuration; and
    the connection is configured to transmit the filtered application data to the algorithm entity.

17. A method in a User Equipment, UE, accessing a telecommunications system including a base station, a connection from the UE to a Data Network, DN, via the base station, and an algorithm entity on the DN, wherein the UE:
    executes a UE application producing application data;
    receives a filtering configuration for the application data from a DN application executing on the algorithm entity, the filtering configuration being based on network configuration information sent from the base station to the algorithm entity;
    filters the application data according to the filtering configuration; and
    transmits the filtered application data to the algorithm entity.

18. A method for radio access network operation of a base station in a telecommunication system, the method comprising:
    transmitting network configuration information from the base station to a Data Network, DN;
    executing the network configuration information by a DN application residing on an algorithm entity in the DN;
    receiving a filtering configuration from the DN application based on the network configuration information;
    transmitting the filtering configuration to a User Equipment, UE, that accesses the telecommunication system;
    receiving filtered application data from the UE, the filtered application data is filtered based on the filtering configuration; and
    transmitting the filtered application data to the algorithm entity in the DN.

* * * * *